United States Patent [19]

Nemazie et al.

[11] Patent Number: 5,696,775
[45] Date of Patent: Dec. 9, 1997

[54] METHOD AND APPARATUS FOR DETECTING THE TRANSFER OF A WRONG SECTOR

[75] Inventors: Siamack Nemazie, San Jose; Son H. Ho, Sunnyvale; Ronald M. Yamada, Santa Clara; Sunil Bhaskar Chaudhari, Fremont, all of Calif.; Christopher Paul Zook, Longmont, Colo.

[73] Assignee: Cirrus Logic, Inc., Fremont, Calif.

[21] Appl. No.: 757,074

[22] Filed: Nov. 26, 1996

Related U.S. Application Data

[63] Continuation of Ser. No. 310,973, Sep. 23, 1994, abandoned.

[51] Int. Cl.[6] .......................... G06F 11/10; G11B 20/18
[52] U.S. Cl. .............................................. 371/51.1
[58] Field of Search ..................................... 371/51.1

[56] References Cited

U.S. PATENT DOCUMENTS

| | | | |
|---|---|---|---|
| 3,375,507 | 3/1968 | Gleim et al. | 340/174.1 |
| 4,209,809 | 6/1980 | Chang et al. | 360/53 |
| 4,297,737 | 10/1981 | Andresen et al. | 360/135 |
| 4,434,487 | 2/1984 | Rubinson et al. | 371/10.2 |
| 4,498,146 | 2/1985 | Martinez | 364/900 |
| 4,504,873 | 3/1985 | Bandy et al. | 360/63 |
| 4,507,693 | 3/1985 | Matsuda et al. | 360/72.2 |
| 4,656,532 | 4/1987 | Greenberg et al. | 360/48 |
| 4,736,341 | 4/1988 | Redmond et al. | 364/900 |
| 4,814,903 | 3/1989 | Kulakowski et al. | 360/48 |
| 4,827,423 | 5/1989 | Beasley et al. | 364/468 |
| 4,847,705 | 7/1989 | Weng et al. | 360/49 |
| 4,914,530 | 4/1990 | Graham et al. | 360/48 |
| 4,924,331 | 5/1990 | Robinson et al. | 360/72.1 |
| 4,935,825 | 6/1990 | Worrell et al. | 360/54 |
| 5,075,804 | 12/1991 | Deyring | 360/49 |
| 5,111,444 | 5/1992 | Fukushima et al. | 369/58 |
| 5,172,381 | 12/1992 | Karp et al. | 371/42 |
| 5,182,752 | 1/1993 | DeRoo et al. | 371/37.7 |
| 5,200,864 | 4/1993 | Dunn et al. | 360/48 |
| 5,200,959 | 4/1993 | Gross et al. | 371/21.6 |
| 5,233,618 | 8/1993 | Glider et al. | 371/68.1 |
| 5,235,585 | 8/1993 | Bish et al. | 369/54 |
| 5,255,136 | 10/1993 | Machado et al. | 360/77.02 |
| 5,270,877 | 12/1993 | Fukushima et al. | 360/48 |
| 5,270,979 | 12/1993 | Harari et al. | 365/218 |
| 5,271,018 | 12/1993 | Chan | 371/10.2 |

*Primary Examiner*—Stephen M. Baker
*Attorney, Agent, or Firm*—Haverstock & Associates Bronson, Bronson & McKinnon; Dan Shifrin

[57] ABSTRACT

A method and apparatus for detecting the transfer of a wrong sector uses the LBA to ensure that a correct sector is transferred. The LBA may be appended to the sector data during a write operation and verified during a read operation. Preferably, the LBA is embedded into the CRC block during a write operation and used to detect the transfer of a wrong sector during a read operation. The LBA may be embedded within the CRC, before or after it is transmitted to a CRC Generator/Checker, by Exclusive-ORing the sector data or CRC data with the LBA. During a read operation, the incoming CRC is Exclusive-ORed with the expected LBA of the sector being read, thereby eliminating the LBA from the CRC data. The CRC data is then checked by the CRC Generator/Checker and an error is signalled if the CRC data does not match. Using the method and apparatus of the present invention, the LBA may also be embedded in the CRC during format and minimal latency operations. Off-line sector identification is performed by extracting the LBA from the CRC for formats with and without an ID field.

26 Claims, 7 Drawing Sheets

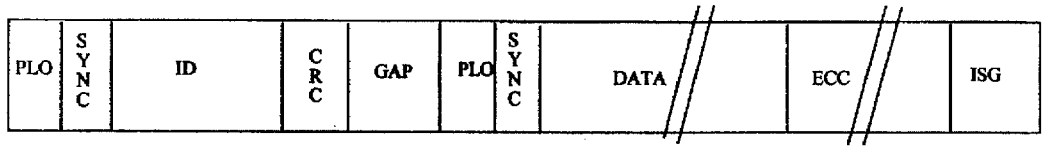
Figure 5
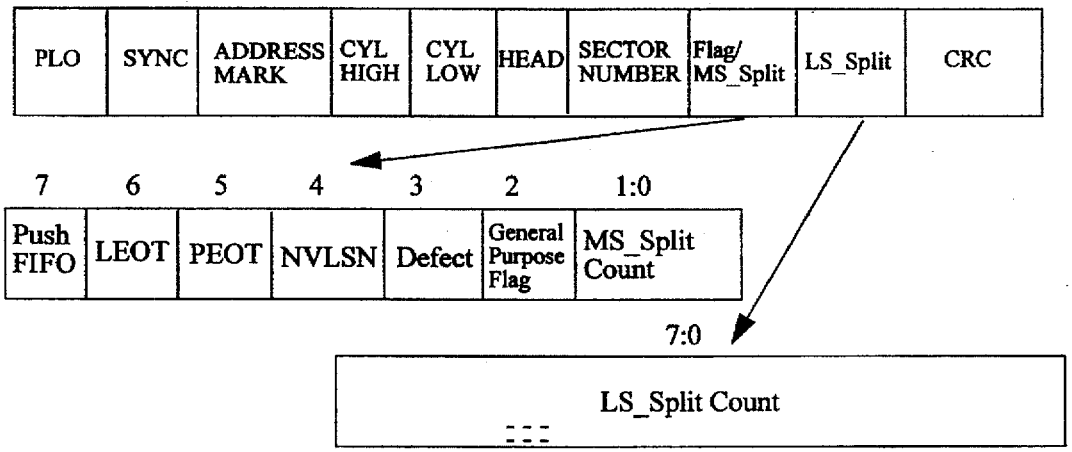
Figure 6e
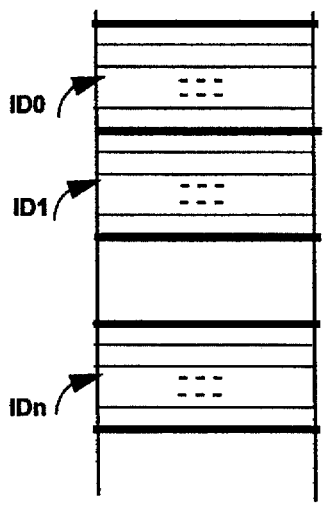
Figure 6a Track Format Table (ID)
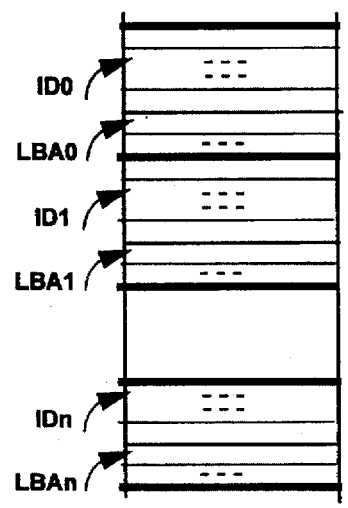
Figure 6b Track Format Table (ID+LBA)

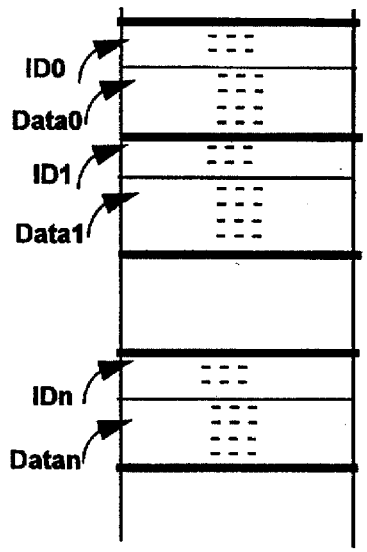
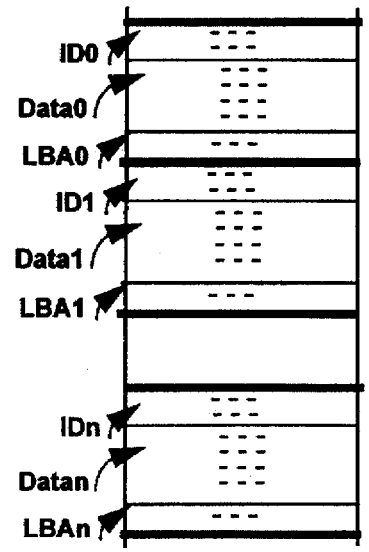
Figure 6c Track Format Table (ID+Data)  Figure 6d Track Format Table (ID+Data+LBA)
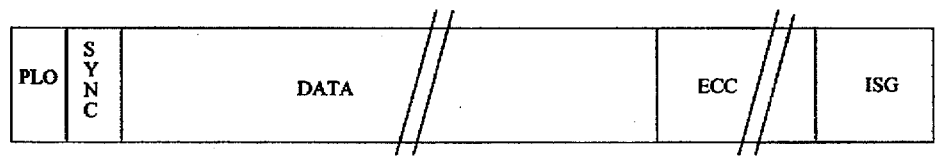
Figure 7b
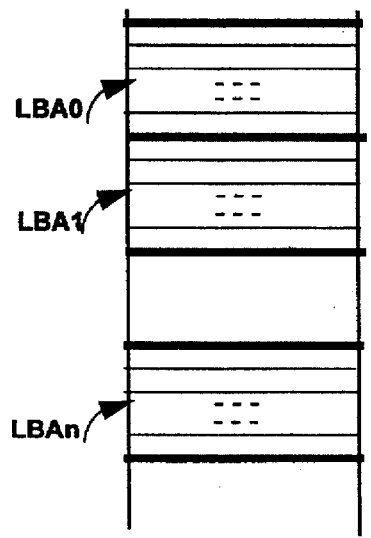
Figure 7a Track Format Table for ID_Less

METHOD AND APPARATUS FOR DETECTING THE TRANSFER OF A WRONG SECTOR

This application is a continuation of application Ser. No. 08/310,973, filed Sep. 23, 1994, now abandoned.

FIELD OF THE INVENTION

The present invention relates to the control of storage systems for digital computers. More particularly, the present invention relates to a method and apparatus for increasing the reliability of data transfers to and from a storage system, by detecting the transfer of a wrong sector between the storage media and the host computer.

BACKGROUND OF THE INVENTION

Increasing data integrity in storage systems for digital computers while achieving an overall low probability of transferring undetected erroneous data is a constant objective of system designers. One such scheme is the incorporation of a cyclic redundancy code (CRC) for each sector of data. In this scheme, the CRC is generated at the host interface and appended to data in the local buffer memory, as illustrated in FIG. 1. When writing the sector to the storage media, the CRC is checked as data is fetched from the local buffer. The CRC is then also written on the storage media along with the data for the sector. When reading the sector from the media, the CRC is checked and written to the local buffer. The CRC is then checked as data is fetched from the local buffer and sent to the host. The buffer CRC provides protection for the local buffer and other circuitry in the path between the host, media and back to the host. The error correction code (ECC) also reduces the probability of transferring erroneous data. However, neither the CRC or the ECC ensure the detection of the transfer of a wrong sector from the storage media to the host.

During a read or write operation, a specific sector is identified and must then be located on the media before the sector can be read from or written to. Automatic track processing maps the physical sector numbers on the track to logical sector numbers, taking into account the defect management strategy employed in the disk drive system and the skew, if any, of the system. The operating system will refer to blocks or sectors on the storage media in either an LBA mode or a CHS mode. In the LBA (Logical Block Address) mode the blocks are logically addressed from 0 to the Maximum Logical Block supported by the device. In the CHS mode, the blocks are addressed with a logical CHS (Cylinder, Head, Sector) triplet value. Typically, this logical CHS value has no relation to the physical block address comprised of the physical values of cylinder, head and sector, which identify the physical address of the block on the storage media. Based on the values for Maximum Cylinder Number, Maximum Head Number and Maximum Sector Number, the logical CHS is converted to an LBA. The LBA is then converted to a physical block address.

The skew of a system is a parameter which combines the head skew, the cylinder skew and the zone skew and represents the number of sectors that the system travels over as it changes from one cylinder or track to another or from one zone on the disk to another. For example, as the system travels from the end of one track to the beginning of a subsequent track, the system may travel over a number of sectors before it is ready to begin the operation for that track. The systems described above did not have a skew and began logically numbering the sectors from the INDEX mark. Disk drive systems which do have a skew value will begin the logical sector numbering of sectors on the track from the first sector at which the system is ready to begin the operation, which is not at the beginning of the track or the INDEX mark. These systems would then number the logical sectors consecutively, beginning from this sector and would continue numbering the sectors until this sector is again reached.

OBJECTS AND SUMMARY OF THE INVENTION

An object of the present invention is to eliminate any real time intervention by the microprocessor controlling the disk drive for initiating the transfer of data from the host to the local buffer after receiving the command to perform CHS to LBA conversion. Another object of this invention is to eliminate any hardware necessary to perform the CHS to LBA conversion. Yet another object of this invention is to achieve the LBA checking with a minimum addition of hardware to the buffer CRC hardware. A still further object of this invention is to provide a simple method and apparatus for providing the LBA to be embedded in the CRC during disk read, write and format operations. A further object of this invention is to enable off-line sector identification, by extracting the LBA embedded in the CRC, for formats with and without ID.

A method and apparatus for detecting the transfer of a wrong sector uses the LBA to ensure that a correct sector is transferred. The LBA may be appended to the sector data during a write operation and verified during a read operation. Preferably, the LBA is embedded into the CRC block during a write operation and used to detect the transfer of a wrong sector during a read operation. The LBA may be embedded within the CRC, before or after it is transmited to a CRC Generator/Checker, by Exclusive-ORing the sector data or CRC data with the LBA. During a read operation, the incoming CRC is Exclusive-ORed with the expected LBA of the sector being read, thereby eliminating the LBA from the CRC data. The CRC data is then checked by the CRC Generator/Checker and an error is signalled if the CRC data does not match. Using the method and apparatus of the present invention, the LBA may also be embedded in the CRC during format and minimal latency operations. Off-line sector identification is performed by extracting the LBA from the CRC for formats with and without an ID field.

BRIEF DESCRIPTION OF THE DRAWINGS

FIG. 5 illustrates a typical format for a sector including an ID field.

FIG. 6a illustrates a track format table including the IDs for the sectors on the track.

FIG. 6b illustrates a track format table including the IDs and LBAs for the sectors on the track.

FIG. 6c illustrates a track format table including the ID and Data fields for the sectors on the track.

FIG. 6d illustrates a track format table including the ID, Data and LBA fields for the sectors on the track.

FIG. 6e illustrates the bits within the flag byte of an ID field of a sector.

FIG. 7a illustrates a track format table for an ID_Less format including only the LBA for the sectors on the track.

FIG. 7b illustrates a typical ID_Less format for a sector.

DETAILED DESCRIPTION OF THE PREFERRED EMBODIMENT:

The present invention uses the LBA to detect the transfer of a wrong sector. In one embodiment the LBA of the sector is appended to the data of the sector at the host interface during a write operation and verified at the host interface during a read operation. However, this embodiment requires additional hardware and space within the system.

The preferred embodiment of the present invention embeds the LBA into the CRC block and extends the CRC operation to detect the transfer of the wrong sector using the LBA. The LBA is not embedded in the CRC during transfer of the data from the host to the local buffer. The LBA is embedded in the CRC during a write to media operation and verified during read back from the media. The LBA within the CRC is finally verified at the host interface during a read operation.

Using this method, the LBA need not be known or initialized by the microcontroller prior to starting the transfer of data from the host to the local buffer. Typically, the block address in either CHS or LBA format is sent along with the operation command. If the block address is in CHS format, then the CHS format must be converted to the LBA format. The ATA standard supports both CHS, and LBA formats. The timing of transfer of data from the host to the storage device is under the control of the device. The CHS to LBA conversion is performed by the local microcontroller. After completion of the setup, the transfer is initiated by the local microcontroller. For performance enhancements, most devices support an Auto-Write mode in which the storage device is ready to transfer data from the host in a few microseconds. This requires the controller to handle the command automatically, without intervention from the local microcontroller.

Figure 1:
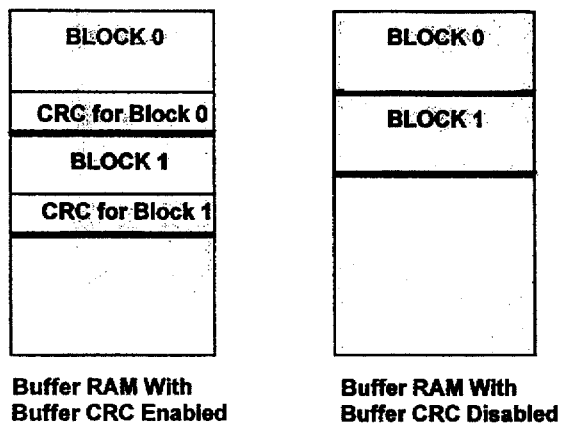
FIG. 1 illustrates two blocks of data within a buffer RAM showing CRC enabled and disabled.
Figure 2:
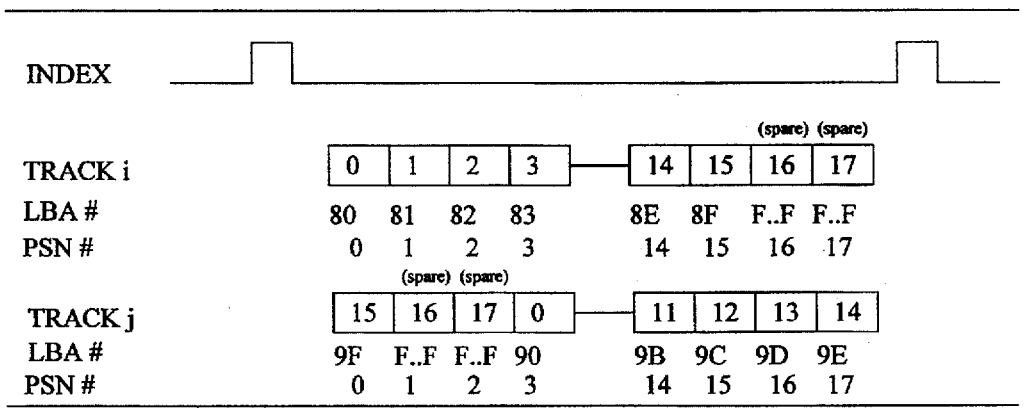
FIG. 2 illustrates two adjacent tracks within a storage media, each having 18 physical sectors, 16 logical sectors and 2 spare sectors.

Using the method of the present invention, the LBA of the sector must also be known during formatting of the disk drive. This requires assigning an invalid LBA to invalid logical sectors on the media such as slipped sectors, or unassigned spare sectors. FIG. 2 illustrates two adjacent tracks i and j, each having 18 physical sectors, 16 logical sectors and 2 spare sectors. The track i has a skew of 0 and the track j has a skew of 3. During a format of the track i, the spare sectors having physical sector numbers 16 and 17 must be assigned an invalid LBA value F..F. Similarly, the spare sectors on track j having physical sector numbers 1 and 2 must be assigned an invalid LBA value F..F.

Figure 3:
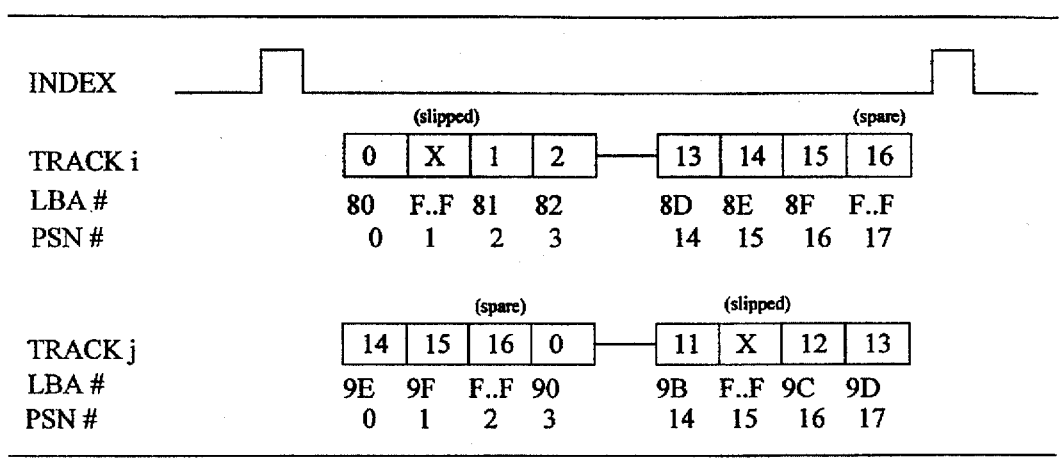
FIG. 3 illustrates two adjacent tracks i and j, each having 18 physical sectors, 16 logical sectors and 2 spare sectors, wherein each track has a defective sector which is slipped.

FIG. 3 shows two adjacent tracks i and j, each having 18 physical sectors, 16 logical sectors and 2 spare sectors. The track i has a skew of 0 and the track j has a skew of 3. The defective physical sector number 1 on track i and the defective physical sector number 15 on track j, are both slipped. During a format operation of track i, the slipped physical sector number 1 and the spare physical sector number 17, must both be assigned an invalid LBA value F..F. Similarly, the physical sector numbers 2 and 15 on the track j are also both assigned an invalid LBA value F..F.

Figure 4:
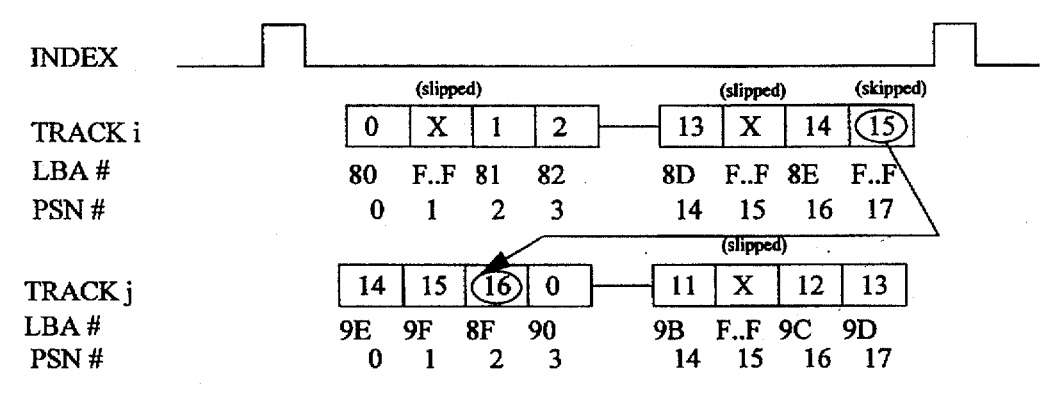
FIG. 4 illustrates two adjacent tracks i and j, each having 18 physical sectors, 16 logical sectors and 2 spare sectors, wherein a defective sector from the track i is mapped to a spare sector on the track j.

FIG. 4 shows two adjacent tracks i and j, each having 18 physical sectors, 16 logical sectors and 2 spare sectors. The track i has a skew of 0 and the track j has a skew of 3. The defective physical sector numbers 1 and 15 on the track i, and the defective physical sector number 15 on the track j are all slipped. Furthermore, the skipped defective logical sector number 15 (physical sector number 17) on the track i is mapped to the spare physical sector number 2 on the track j. In this example, during a format operation of the track i, the slipped physical sector numbers 1 and 15 are assigned an invalid LBA value F..F. Similarly, the physical sector number 15 on the track j is assigned an invalid LBA value F..F. The physical sector number 2 on the track j is assigned the LBA value 8F, which corresponds to the LBA of the defective sector 15 on the track i. These examples illustrate the additional complexity that the disk controller must support during the format operation when the method of the present invention is utilized and the LBA is embedded in the CRC.

A. Description of the Apparatus of the Present Invention

Figure 9:
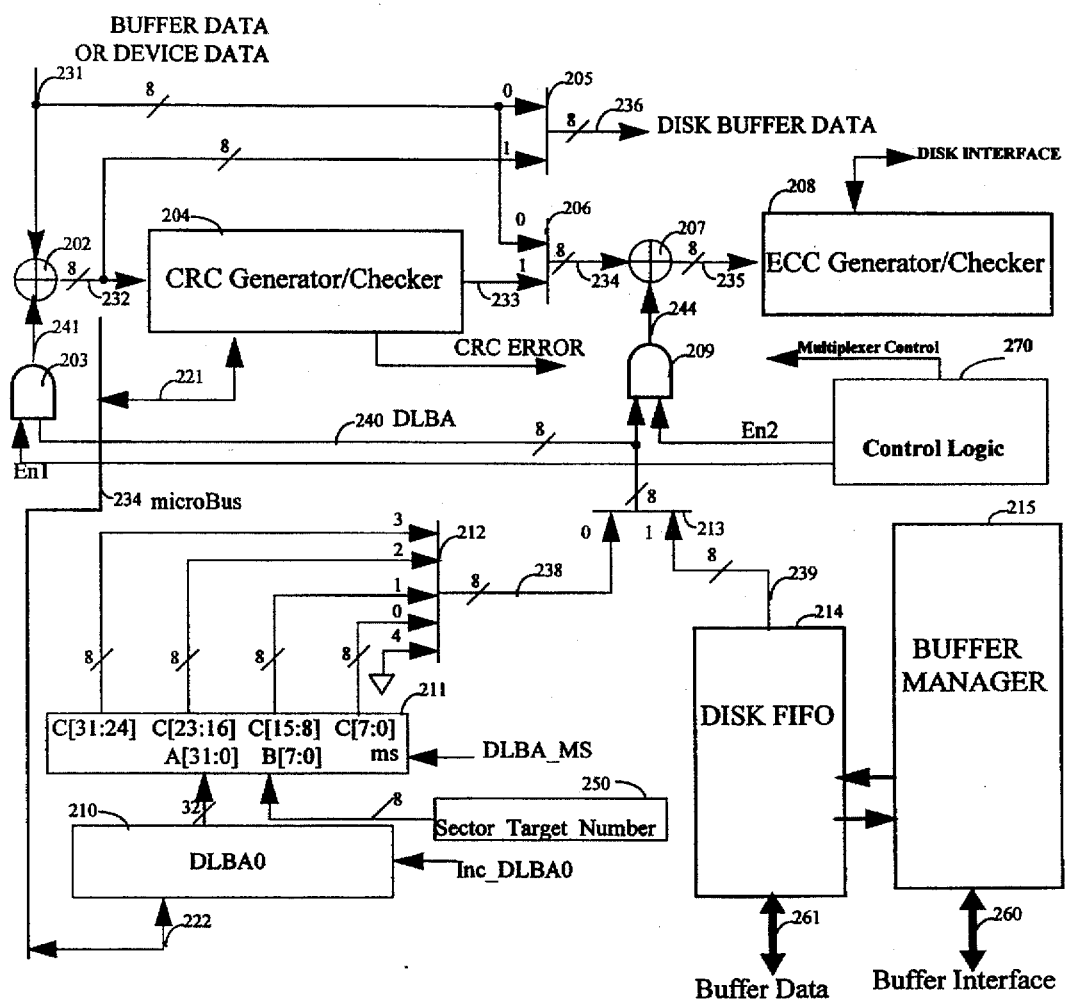
FIG. 9 illustrates a schematic block diagram of the preferred embodiment of the disk CRC Generator/Checker for the present invention.

A block diagram schematic of the apparatus of the present invention is illustrated in FIG. 9. Depending on the operation, the data fetched from the local buffer or the data from the storage media is operatively coupled to the signal line bus 231. The signal line bus 231 is coupled as an input to the Exclusive-OR gate 202, as the input 0 to the multiplexer 205 and as the input 0 to the multiplexer 206. The Disk LBA Register DLBA0 210 is coupled to the microbus 234 by the read/write port 222. The control signal line Inc_DLBA0 is coupled to the Disk LBA Register DLBA0 210 for incrementing the contents of the Disk LBA Register DLBA0 210. The output of the Disk LBA Register DLBA0 210 is coupled as the A input to the addition logic block 211. The Sector Target Number Register 250 is coupled as the B input to the addition logic block 211. The Disk LBA Mode Select control signal DLBA_MS is coupled to the addition logic block 211.

The addition logic block 211 has a thirty-two bit output divided into four groups, each having eight bits. The bits 0–7 of the output of the addition logic block 211 are coupled as the input 0 to the multiplexer 212. The bits 8–15 of the output of the addition logic block 211 are coupled as the input 1 to the multiplexer 212. The bits 16–23 of the output of the addition logic block 211 are coupled as the input 2 to the multiplexer 212. The bits 24–31 of the output of the addition logic block 211 are coupled as the input 3 to the multiplexer 212. The input 4 of the multiplexer 212 is coupled to ground. The output 238 of the multiplexer 212 is coupled as the input 0 of the multiplexer 213.

The Buffer Manager 215 is coupled to the Buffer Interface by the signal line bus 260. The Disk First-In First-Out Stack (FIFO) 214 is coupled to the Buffer Data by the signal line bus 261. The Buffer Manager 215 is coupled to the Disk FIFO 214. The output 239 of the Disk FIFO 214 is coupled as the input 1 to the multiplexer 213. The output 240 of the multiplexer 213 is coupled as an input to the AND gate 209 and as an input to the AND gate 203. The Enable signal line En1 is coupled as the other input to the AND gate 203. The Enable signal line En2 is coupled as the other input to the AND gate 209. The output 241 of the AND gate 203 is coupled as an input to the Exclusive-OR gate 202. The output 232 of the Exclusive-OR gate 202 is coupled as an input to the CRC Generator/Checker 204 and as the input 1 to the multiplexer 205. The output 236 of the multiplexer 205 is coupled to the Disk Buffer Data.

The CRC Generator/Checker 204 is coupled to the microbus 234 by the read/write port 221. The CRC Generator/Checker 204 is coupled to output the error signal CRC ERROR. The output 233 of the CRC Generator/Checker 204 is coupled as the input 1 to the multiplexer 206. The output 234 of the multiplexer 206 is coupled as an input to the Exclusive-OR gate 207. The output 244 of the AND gate 209 is coupled as an input to the Exclusive-OR gate 207. The output 235 of the Exclusive-OR gate 207 is coupled as an input to the ECC Generator/Checker 208. The output of the ECC Generator/Checker 208 is coupled to the storage media.

Figure 10:
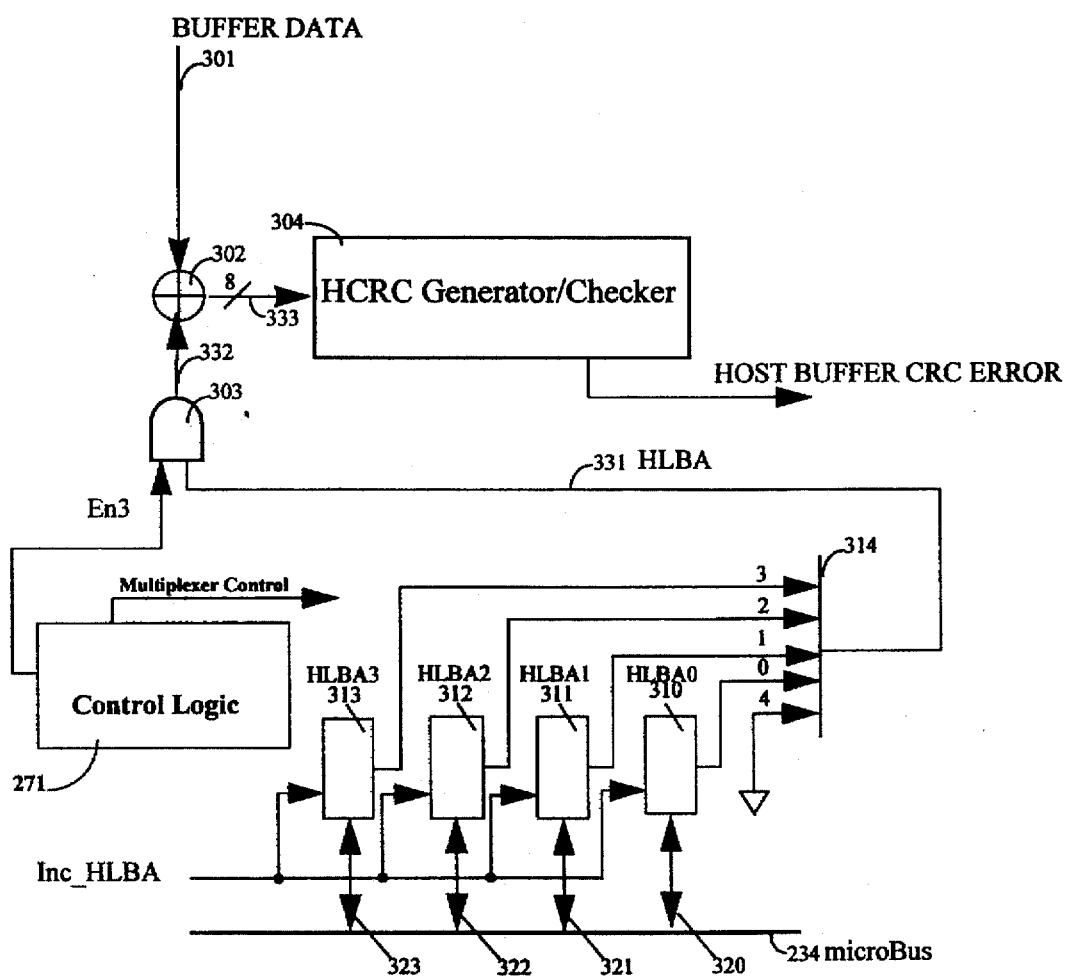
FIG. 10 illustrates a schematic block diagram of the preferred embodiment of the Host CRC Generator/Checker for the present invention.

A schematic block diagram of the Host CRC Generator/Checker of the present invention is illustrated in FIG. 10. The microbus 234 is coupled to the Host LBA counters 310–313 by the signal line busses 320–323, respectively. The control signal line Inc_HLBA is coupled to each of the Host LBA counters 310–313 for incrementing the counters 310–313. The output of the Host LBA counter 310 is coupled as the input 0 to the multiplexer 314. The output of the Host LBA counter 311 is coupled as the input 1 to the multiplexer 314. The output of the Host LBA counter 312 is coupled as the input 2 to the multiplexer 315. The output of the Host LBA counter 313 is coupled as the input 3 to the multiplexer 314. The input 4 to the multiplexer 314 is coupled to ground.

The output 331 of the multiplexer 314 is coupled as an input to the AND gate 303. The enable signal lines En3 are coupled as the other input to the AND gate 303. The output 332 of the AND gate 303 is coupled as an input to the Exclusive-OR gate 302. The signal lines 301 are coupled to the buffer and as an input to the Exclusive-OR gate 302. The output 333 of the Exclusive-OR gate 302 is coupled as an input to the HCRC Generator/Checker 304. The HCRC Generator/Checker 304 is coupled to output the error signal HOST BUFFER CRC ERROR.

The microcontroller is operatively coupled to the microbus 234 through the read/write ports 221, 222 and 320–323 for accessing the appropriate registers. The enable signal lines En1 and En2 are coupled to the control logic 270. The enable signal line En3 is coupled to the host control logic 271. The control signal lines for selecting the appropriate input of the multiplexers 205, 206, 212 and 213 are also coupled to the control logic 270. The control signal line for selecting the appropriate input of the multiplexer 314 is coupled to the host control logic 271. The enable signal lines En1 and En2 and the control signal lines for selecting the appropriate input of the multiplexers 205, 206, 212 and 213 are generated by the control logic 270 automatically. The enable signal line En3 and the control signal line for selecting the appropriate input of the multiplexer 314 are generated by the host control logic 271 automatically.

It should be understood that the Exclusive-OR gates 202, 207 and 302 are bus Exclusive-OR gates, e.g. they each consist of eight 2-input Exclusive-OR gates where each 2-input Exclusive-OR gate receives a pair of like-positioned bits from the two input busses and delivers from the two input busses, a like-positioned bit to the output bus. Also, the AND gates 203, 209 and 303 are bus AND gates, e.g. they each consist of eight 2-input AND gates where one input of each 2-input AND gate receives one corresponding bit of the input bus and the other input of each 2-input AND gate is coupled to the common enable signal.

B. Description of the Method of the Present Invention

During a transfer from the host to the local buffer, the LBA is not embedded in the CRC, and hence there is no requirement to know the LBA prior to initiating this transfer. The LBA is embedded in the CRC when the data is written to the media. During this operation, the buffer CRC is checked with the CRC output from the CRC Generator/Checker 204. While this CRC check is performed the buffer CRC is Exclusive-ORed with the LBA of the sector being written represented by the value DLBA. The modified CRC is then sent to the error correction code (ECC) Generator/Checker 208 and subsequently written to the storage media. The ECC covers the data and the modified CRC with embedded LBA. The ECC is used to detect and correct soft or hard errors on the storage media.

Prior to starting a write operation, the LBA registers 210 are initialized with the LBA of the first sector to be written. The LBA registers are then automatically updated after a sector is written to the media. During a read operation, after the target sector is identified, the data field is transferred to the local buffer. At CRC time, the incoming CRC is Exclusive-ORed with the expected LBA of the sector being read, generated from the register DLBA0 210. CRC time refers to the time when the signal CRC_time is asserted. This logic operation separates the LBA from the CRC and thereby recovers the original CRC which is sent to the CRC Generator/Checker 204. Optionally, either the incoming CRC from the media, or the CRC Exclusive-ORed with the expected LBA value DLBA is written to the local buffer.

Prior to starting the read operation, the LBA registers 210 are initialized with the expected LBA of the first target sector. Subsequently, the LBA registers are automatically updated after a sector is read from media. It should be noted that the LBA checking operation of the present invention is an additional check to ensure correct sector identification and transfer and is not intended to replace the sector identification operation. A mismatch between the expected LBA value DLBA, and the LBA embedded in the CRC field on the media will result in an error being signalled on the signal line CRC ERROR, by the CRC Generator/Checker 204.

To complete the read operation, the data sectors requested by the host, which were transferred from the media to the local buffer, are subsequently transferred to the host. During this transfer to the host, at buffer CRC time the incoming buffer CRC fetched from the local buffer is Exclusive-ORed with the expected LBA at the host HLBA generated by the registers 310–313. This logic operation recovers the original buffer CRC which is then sent to the host CRC Generator/Checker 304. Prior to starting the transfer from the local buffer to the host, the HLBA registers 310–313 are initialized with the expected LBA of the first sector. Subsequently, the HLBA registers 310–313 are automatically updated after a sector is transferred to the host. A mismatch between the expected LBA at the host interface value HLBA and the LBA embedded in the buffer CRC will result in an error being signalled on the signal line HOST BUFFER CRC ERROR, by the HCRC Generator/Checker 304.

During a disk read or write operation the logical sectors are generally accessed sequentially. The LBA of the next logical sector can therefore be computed by incrementing the expected LBA value DLBA, where the expected LBA value DLBA was initialized to the first target sector. However, there are disk operations where the above model will not hold and the expected LBA value DLBA cannot be so computed. The format operation is one operation in which sequential physical sectors are written on the track, and the mapping of physical to logical sectors on the track is required in order to compute the LBA of the next physical sector. Minimal or zero latency read and write operations are another type of operation in which the LBA of the next target sector on the track is not simply computed by incrementing the expected LBA value DLBA of the current sector being accessed. Minimal latency operations are characterized by starting a read or write operation on the track, not at the first target sector, but as soon as the next sector on the track is identified to belong to the group of sectors that must be accessed. For example if the operation requires reading the logical sectors 4 through 15 on the track, if the next sector is identified to be the logical sector 10, the minimal latency operation starts reading the logical sectors 10 through 15. The sectors 0 through 9 will then be read. Using such an operation, the latency in waiting for the first target sector is avoided.

The present invention also includes methods which support embedding the LBA in the data CRC during the format operation and minimal latency operations. A table driven method is used to support the format operation, and a simple computational method is used to support sequential as well as minimal latency read and write operations.

A format of a sector including an ID field is illustrated in FIG. 5. The ID field is the unique identification for each sector in a track of a disk drive media and differentiates one sector from another. In formats with an ID field, the ID field for each sector typically comprises a Cylinder low byte, a Cylinder high byte, a Head number byte, a Sector Number byte, and a Flag byte. The Flag byte within the ID field is illustrated in FIG. 6e and comprises a Logical End Of Track bit (LEOT), a Physical End Of Track bit (PEOT), a Defect bit, a Not Valid Logical Sector Number bit (NVLSN) and a General Purpose (GP) flag bit. In a system using an ID_Less format sector, as illustrated in FIG. 7, a Defect Management Apparatus is used to translate the Physical Sector Number to a Logical Sector Number and to also generate the appropriate flags.

Figure 8:
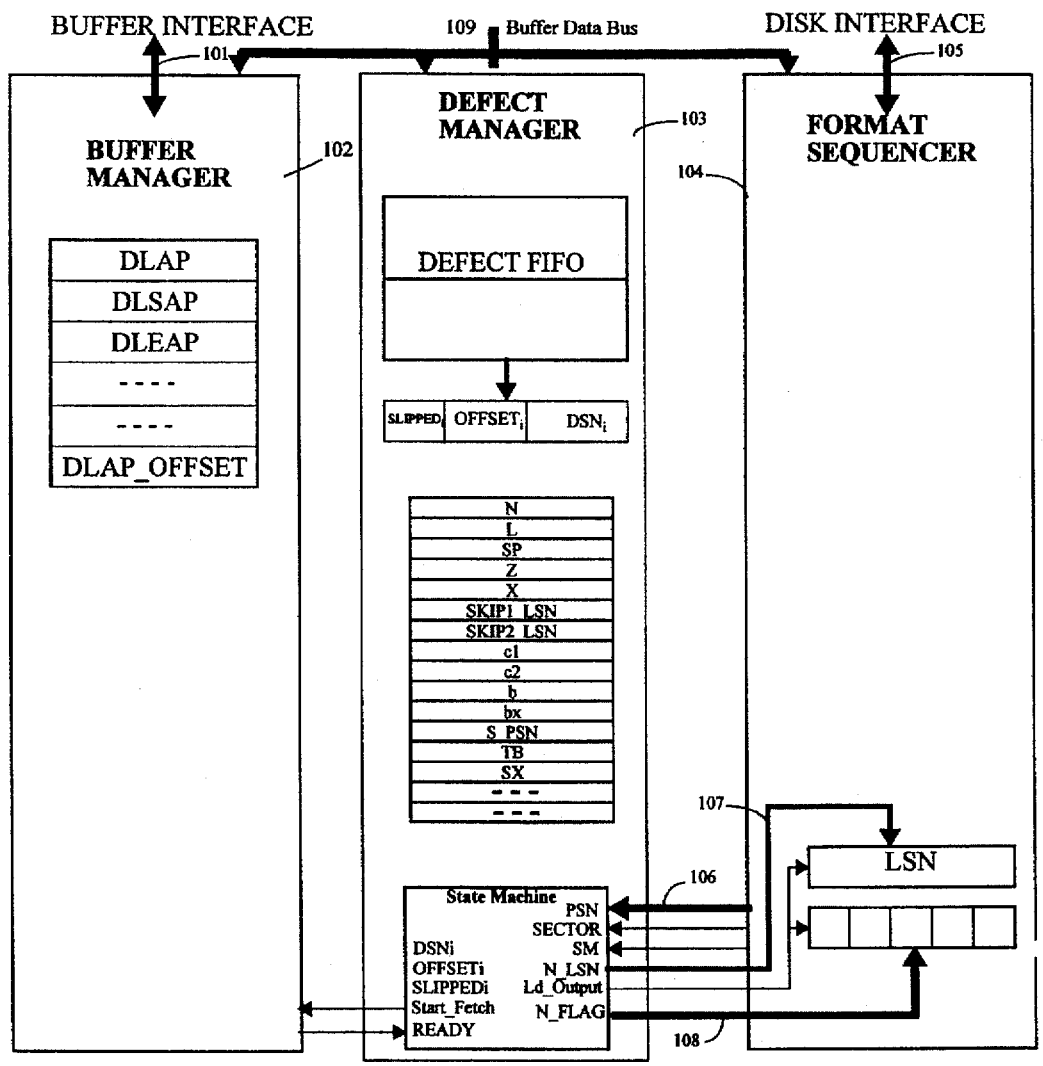
FIG. 8 illustrates a schematic block diagram of a defect management apparatus.

A block diagram schematic of a Defect Management Apparatus coupled to other blocks within the system is illustrated in FIG. 8. The Defect Management Apparatus otherwise referred to as the defect manager 103 is coupled to the buffer manager 102 and the format sequencer 104 by the buffer data bus 109 and other control signal lines. The buffer manager 102 is further coupled to the buffer interface. The format sequencer 104 is further coupled to the disk interface. The defect manager 103 translates the physical sector number PSN received from the format sequencer 104 on the signal lines 106, to a Logical Sector Number N LSN which is transmitted to the format sequencer 104 on the signal lines 107. The defect manager 103 also transmits the appropriate flags to the format sequencer 104 on the signal lines 108. The flags are comprised of a Logical End of Track Flag (LEOT), a Physical End Of Track Flag (PEOT), a Defect flag and a Not Valid Logical Sector Number flag (NVLSN). One such apparatus is taught by the U.S. patent application Ser. No. 08/206,096 titled "Defect Management For Automatic Track Processing without ID Field," filed on Mar. 3, 1994, which is hereby incorporated by reference.

The steps to compute the LBA during a format operation will be discussed with reference to the particular defect management strategy illustrated in FIG. 4. If the sector is a valid logical sector then the LBA is computed by adding the LBA of the logical sector number 0 on the track (LBA0) to the Logical Sector Number (LSN). If the sector is a defective or unassigned spare sector, the LBA is set to equal an invalid value such as F..F. If the sector is a spare assigned sector, the LBA is set equal to the LBA of the logical sector that was mapped to the spare sector. The completion of these steps requires a means to detect such conditions and a means to compute the correct LBA.

For completion of format operations with or without an ID field, the local microcontroller must first perform defect management and based on the particular method of defect management employed in the storage system, map the physical sectors on the track to logical sectors and generate a corresponding LBA. For format operations with an ID field, a format table is constructed in the local buffer. As illustrated in FIG. 6a, this format table consists of the IDs of the sectors on the track. During the formatting of the track this format table is automatically accessed for writing the ID fields. During formatting, the data field is usually a constant fixed pattern, supplied by the format sequencer. If a random pattern data field is desired, then the data field will be stored in the format table after the ID field for each sector, as illustrated in FIG. 6c. In the present invention, this table driven scheme is extended to include the LBA of the sector in addition to the ID field for each entry in the table, as illustrated in FIG. 6b. As previously mentioned, the data field is usually a constant fixed pattern during a format operation and is supplied by the format sequencer 104. If a random pattern data field is desired, the data field will be stored after the ID field and before the LBA entries in the format table, as illustrated in FIG. 6d.

An alternative method of the present invention is to include the CRC with embedded LBA in the format table. The disadvantage of such a method over the above preferred embodiment, is that it requires a mode of operation which generates the CRC of the data without any write to the media, or computes the CRC of data using the microcontroller, or in the case of a fixed constant pattern, stores the CRC of the data somewhere in the drive subsystem. An Enable Disk LBA from Table bit EnDlbaT is an operation mode select bit which is used to indicate that the LBA is included in the track format table for performing a format operation from the track format table. When the Enable Disk LBA from Table bit EnDlbaT is initialized to a logical one, the LBA is included in the track format table.

The method of the present invention supports systems using an ID_Less format by eliminating the ID field entries from the format table, as illustrated in FIG. 7b.

When the Enable Disk LBA from Table bit EnDlbaT is initialized to a logical zero, the LBA can be computed from the Disk LBA0 register (DLBA0) and the Target Sector Number (TSN), in two different ways: Case (1) The contents of the register DLBA0 are initialized with the LBA of the first target sector, and are then incremented along with the update of the Target Sector Number after a sector transfer; and Case (2) The contents of the register DLBA0 are initialized with the LBA of the logical Sector 0 (LBA0), and the LBA is computed as follows:

LBA=LBA0+TSN where: LBA0=LBA of logical sector number 0 on track; and

TSN=Logical Sector Number of the Target Sector.

The logical sector number of the Target Sector Number TSN is updated by the format sequencer 104 after every access, and is reset to zero after reaching the maximum logical sector number on the track. This method supports not only sequential operations, but also minimal latency operations. The mode of computation of LBA is selected by the microcontroller by initializing a Disk LBA Mode Select bit DLBA_MS which is input to the addition logic block 211. When the bit DLBA_MS is initialized to a logical one, the case (1) is selected and when the bit DLBA_MS is initialized to a logical zero, the case (2) is selected.

C. Operation of the Apparatus of the Present Invention

The apparatus of the present invention includes multiple registers and modes of operation which are initialized by the local microcontroller. When an Enable Disk Buffer CRC bit EnDBCRC is set, the buffer CRC is enabled between the disk interface and the local buffer. If the Enable Disk Buffer CRC bit EnDBCRC is reset, the buffer CRC between the disk interface and the local buffer is disabled. When the buffer CRC between the disk interface and the local buffer is disabled, the CRC bytes are not appended to the buffer when data is written to the buffer or checked when data is read from the buffer. When an Enable Host Buffer CRC bit EnHBCRC is set, the buffer CRC between the host interface and the local buffer is enabled. If the Enable Host Buffer CRC bit EnHBCRC is reset, the buffer CRC between the host interface and the local buffer is disabled. When the buffer CRC between the host interface and the local buffer is disabled, the CRC bytes are not appended to the buffer when data is written to the buffer or checked when data is read from the buffer. When an Enable Host Buffer LBA bit EnHLBA is set, the LBA is checked during a buffer to host transfer. When this bit is set the Enable Host Buffer CRC bit EnHBCRC must also be set, enabling the buffer CRC between the host interface and the local buffer. When an Enable Disk LBA bit EnDLBA is set, the LBA is embedded in the data CRC during a write to the media, and checked during reads from the media. When an Enable Disk Buffer LBA bit EnDBLBA and an Enable Disk Buffer CRC bit EnDBCRC are set, the LBA is embedded in the buffer CRC for disk data transfers. When an Enable Disk LBA from Table bit EnDlbaT is set, this indicates that the LBA is included in the track format table when a formatting operation is conducted using the track format table. When the Enable Disk LBA from Table bit EnDlbaT is reset, and a Disk LBA Mode Select bit DLBA_MS is reset, the Disk LBA Registers 210 contain the LBA0 of the logical sector 0. The LBA is then computed by adding the Logical Sector Number LSN of the target sector TSN to the value stored in the registers DLBA0 210 (DLBA=DLBA0+TSN). When the Enable Disk LBA from Table bit EnDlbaT is reset, and the Disk LBA Mode Select bit DLBA_MS is set, the Disk LBA registers DLBA0 210 contain the LBA of the target sector, and the Disk LBA register DLBA0 210 is updated along with the Sector Target Number Register 250.

The apparatus includes the Host LBA Registers 310-313. When the Buffer CRC and the Host LBA mode are enabled, the value stored in the Host LBA Registers 310-313 will be the expected value of the LBA of the block of data that is transferred to the host. A miscompare will result in the HCRC Generator/Checker 304 reporting a host buffer CRC error condition. The Host LBA Registers 310-313 will be incremented at the end of the transfer to the Host. During a buffer to disk transfer, if the Enable Disk Buffer LBA bit EnDBLBA is set, the DLBA value 240 is the expected value of the LBA of the sector being read from the buffer. A mismatch will result in a buffer CRC error being signalled. Furthermore, if the Enable Disk LBA bit EnDLBA is set, the DLBA value 240 is incorporated in the disk data CRC written on the disk.

During a disk to buffer transfer, if the Enable Disk LBA bit EnDLBA is set, the DLBA value 240 is the expected value of the LBA of the sector being read from the disk. A mismatch will result in an uncorrectable error being signalled. Furthermore, if the Enable Disk Buffer LBA bit EnDBLBA and the Enable Disk Buffer CRC bit EnDBCRC are set, the disk data CRC will be written to the buffer. Otherwise, the CRC of the sector written to the buffer will not include the LBA.

The modes of operation based on different combinations of the Enable Disk Buffer CRC bit EnDBCRC, the Enable Disk LBA bit EnDLBA and the Enable Disk Buffer LBA bit EnDBLBA are summarized in Table 1.

TABLE 1

| EnDBCRC | EnDBLBA | EnDLBA | Disk Operation | |
|---|---|---|---|---|
| 0 | X | 0 | Disk Read: | Check CRC from disk |
|   |   |   | Disk Write: | Write CRC generator output to disk |
| 0 | X | 1 | Disk Read: | XOR DLBA with CRC from disk, and send to CRC checker |
|   |   |   | Disk Write: | XOR DLBA with CRC generator output, and write to disk |
| 1 | 0 | 0 | Disk Read: | Check CRC from disk, Append CRC from disk to data in buffer |
|   |   |   | Disk Write: | Check CRC from buffer, write CRC from buffer to disk |
| 1 | 0 | 1 | Disk Read: | Send CRC from disk to ECC, XOR CRC from disk with DLBA to get CRC, check CRC, Append CRC to data in buffer. |
|   |   |   | Disk Write: | Check CRC from buffer, XOR DLBA with CRC from buffer and write to disk |
| 1 | 1 | 0 | Not Valid | |
| 1 | 1 | 1 | Disk Read: | Send CRC from disk to ECC, XOR CRC from disk with DLBA to get CRC, check CRC, Append disk CRC to data in buffer |
|   |   |   | Disk Write: | XOR DLBA with CRC from buffer, and send to CRC checker, write CRC from buffer to disk |

U.S. patent application Ser. No. 08/147,865 titled "Dual Purpose Cyclic Redundancy Check," filed on Nov. 4, 1993, describes an embodiment of data CRC and extension to buffer CRC and is hereby incorporated by reference. FIG. 9 illustrates the block diagram of the preferred embodiment of the disk CRC generator/checker modified for LBA checking in which the CRC Generator/Checker 204 implements the teaching of the above referenced patent application and the ECC Generator/Checker 208 implements the teaching of U.S. patent application Ser. No. 08/147,650 titled "REED-SOLOMON Decoder," filed on Nov. 4, 1993, which is also hereby incorporated by reference. Alternatively, the CRC Generator/Checker 204 will implement any other method of CRC generation and verification and the ECC Generator/Checker 208 will implement any other method of ECC operation and verification.

In the apparatus of the present invention, as illustrated in FIGS. 9 and 10, the data flow is modified by the introduction of the Exclusive-OR gate 202 at the input of CRC Generator/ Checker 204, the Exclusive-OR gate 207 at the input of the ECC Generator/Checker 208, the multiplexer 206 at the output of the CRC Generator/Checker 204 and the multiplexer 205 used to select the Disk Buffer Data 236. The input of the CRC Generator/Checker 204 is the output of the Exclusive-OR gate 202. The Exclusive-OR gate 202 includes the inputs 231 and 241, where the input 231 is coupled to receive the buffer or device data, and the input 241 is the output of the AND gate 203. The AND gate 203 includes the inputs 240 and En1, where the input 240 is the output of the multiplexer 213 and the input En1 is the enable signal generated automatically by the control logic 270. The input of the ECC Generator/Checker 208 is the output of the Exclusive-OR gate 207. The Exclusive-OR gate 207 includes the inputs 234 and 244, where the input 234 is the output of the multiplexer 206 and the input 244 is the output of the AND gate 209. The multiplexer 206 includes the inputs 231 and 233, where the input 231 is the buffer or device data and the input 233 is the output of the CRC Generator/Checker 204. The AND gate 209 includes the inputs 240 and En2 where the input 240 is the output of the multiplexer 213 and the input En2 is the enable signal generated automatically by the control logic 270.

Except under certain conditions when the signal CRC__ time is asserted, which will be discussed in detail below, the enable signals En1 and En2, the bus 241, and the bus 244 are all at a logical 0, and the multiplexers 205 and 206 will each select their input 0.

i. Operation During A Write To The Storage Media

During a disk write operation if the Enable disk LBA bit EnDLBA and the Enable Disk Buffer CRC bit EnDBCRC are both enabled, and the Enable Disk Buffer LBA bit EnDBLBA is disabled, then when the signal CRC_time is asserted, the buffer CRC data 231 will be input to the CRC Generator/Checker 204 and checked for a mismatch. If there is a mismatch the error bit CRC_ERROR will be set. The buffer CRC data 231 is selected by the multiplexer 206 and input to the Exclusive-OR gate 207. The DLBA value 240 contains the LBA value for the sector where the data is to be written. The multiplexer 213 selects the input 0 and outputs the LBA value from the multiplexer 212. The enable signal lines En2 must be set to add the LBA value to the CRC buffer data after the CRC Generator/Checker 204. When the enable signal lines En2 are set the LBA value is output from the AND gate 209 and input into the Exclusive-OR gate 207. The DLBA value 240 is then Exclusive-ORed with the buffer CRC data 231 and the resulting modified CRC 235 is input to the ECC Generator/Checker 208 and written to the disk. Thus, the ECC covers data and the modified CRC. To complete this operation, when the Enable disk LBA bit EnDLBA and the Enable Disk Buffer CRC bit EnDBCRC are both enabled, the Enable Disk Buffer LBA bit EnDBLBA is disabled and the signal CRC_time is asserted, the control logic 270 will automatically generate the necessary control signals by resetting the enable signal lines En1, setting the enable signal lines En2 and programming the multiplexer 206 to select the input 0.

During a disk write operation if the Enable Disk LBA bit EnDLBA, the Enable Disk Buffer CRC bit EnDBCRC, and the Enable Disk Buffer LBA bit EnDBLBA are all set, then when the signal CRC_time is asserted, the buffer CRC data 231 and the DLBA value 240 are input to the Exclusive-OR gate 202 and Exclusive-ORed together. The output of the Exclusive-OR gate 232 is then input to the CRC Generator/ Checker 204 which is checked for a mismatch. If there is a mismatch, the error bit CRC_ERROR will be set. The buffer CRC data operatively coupled to the signal lines 231 is selected by the multiplexer 206 and input to the Exclusive-OR gate 207. Because the enable signal lines En2 are reset, the output of the AND gate 209 is a logical 0. Therefore, the CRC data is passed through the Exclusive-OR gate 207 and input to the ECC Generator/Checker 208 and written to the disk. A write buffer segment with data from host operation will have the Enable Disk Buffer LBA bit EnDBLBA reset, while a write buffer segment with data from disk operation may have the Enable Disk Buffer LBA bit EnDBLBA set. This is used for sector relocation. Sector relocation is the operation of moving the data from one physical location to another, used in applications such as dynamic defect management in which data is moved from a suspected grown defect to another location. To complete this operation, when the Enable Disk LBA bit EnDLBA, the Enable Disk Buffer CRC bit EnDBCRC and the Enable Disk Buffer LBA bit EnDBLBA are all set and the signal CRC_time is asserted, the control logic 270 will automatically generate the necessary control signals by setting the enable signal lines En1, resetting the enable signal lines En2 and programming the multiplexer 206 to select the input 0.

During a disk write operation if the Enable Disk LBA bit EnDLBA is enabled and the Enable Disk Buffer CRC bit EnDBCRC is disabled, then when the signal CRC_time is asserted, the output 233 from the CRC Generator/Checker 204 is input to the Exclusive-OR gate 207 and Exclusive-ORed with the DLBA value 240. The output of the Exclusive-OR gate 207 is then input to the ECC Generator/ Checker 208 and then written to the disk. The Enable Disk LBA bit EnDLBA can be enabled while the Enable Disk Buffer CRC bit EnDBCRC is disabled. To complete this operation, when the Enable Disk LBA bit EnDLBA is enabled, the Enable Disk Buffer CRC bit EnDBCRC is disabled and the signal CRC_time is asserted, the control logic 270 will automatically generate the necessary control signals by resetting the enable signal lines En1, setting the enable signal lines En2 and programming the multiplexer 206 to select the input 1.

ii. Operation During A Read From The Disk

During a disk read operation, if the Enable Disk LBA bit EnDLBA is enabled when the signal CRC_time is asserted, then the incoming CRC data on the bus 231 is input to the Exclusive-OR gate 202. In this condition, the control logic 270 will automatically set the enable signal lines En1, reset the enable signal lines En2 and program the multiplexer 206 to select the input 0. Because the enable signal lines En1 are set, the DLBA value 240 will also be input to the Exclusive-OR gate 202. The Exclusive-OR gate 202 will then perform an Exclusive-OR operation on the incoming CRC data and the LBA value and the result will be input to the CRC Generator/Checker 204. If the correct sector has been input, this Exclusive-OR operation will eliminate the embedded LBA stored in the CRC and will recover the original CRC. If the correct sector has not been input this will be detected by the CRC Generator/Checker 204 and an error on the signal line CRC ERROR will be output. A mismatch detected by the CRC Generator/Checker 204 will signal that there is an error in the CRC either because of an error in the transmission of the data or because the wrong sector was transferred. The enable signal lines En2 are disabled and the multiplexer 206 is programmed to select the input 0 and output the incoming CRC from the data bus 231. This incoming CRC will then be input to the ECC Generator/ Checker 208.

During a disk read operation if the Enable Disk Buffer CRC bit EnDBCRC and the Enable Disk Buffer LBA bit EnDBLBA are both set, the incoming CRC data on the bus 231 is written to the buffer directly, by controlling the multiplexer 205 to select the input 0. Otherwise, if the Enable Disk Buffer CRC bit EnDBCRC is enabled and the Enable disk buffer LBA bit EnDBLBA is disabled, the input of the CRC Generator/Checker 204 is written to the buffer by controlling the multiplexer 205 to select the input 1. If the Enable Disk LBA bit EnDLBA is set while the Enable Disk Buffer CRC bit EnDBCRC is disabled, the CRC data is not written to the buffer. The CRC registers in the CRC Generator/Checker 204 are accessible by the local microcontroller through the internal microBus 234 and the read/write port 221.

The LBA value DLBA on the signal lines 240 is output from the multiplexer 213, which has an input 0 coupled to the output of the multiplexer 212 and an input 1 coupled to the output of the Disk FIFO 239. When the Enable Disk LBA from Table bit EnDlbaT is set, the multiplexer 213 is programmed to select the input 1 and output the contents of the signal lines 239 which are output from the Disk FIFO 214. The local buffer data is fetched by the Buffer Manager 215 and loaded into the Disk FIFO 214 through the Buffer Data bus 261. During processing of the CRC bytes 0-3 the data from the Disk FIFO 214 is output in sequential order. When the Enable Disk LBA from Table bit EnDlbaT is reset, the multiplexer 213 selects the input 0 and passes through the output of the multiplexer 212.

The Disk LBA Register DLBA0 210 is a 4 byte loadable counter accessible by the local microcontroller through the internal microBus 234 and the read/write port 222. When the control signal Inc_DLBA0 is asserted by the format sequencer 104, the contents of the register DLBA0 210 are incremented. When the Disk LBA Mode Select bit DLBA_MS is reset, the contents of the register DLBA0 210 are initialized to the LBA of the logical sector zero on the track by the microcontroller and the control signal Inc_DLBA0 remains deasserted. The logic block 211 will then perform the function C=A+B, where A is the 32 bit value output from the register DLBA0 210, and B is the 8 bit Sector_Target_Number from the Sector Target Number Register 250. When the Disk LBA Mode Select bit DLBA_MS is set the contents of the register DLBA0 are initialized to the LBA of the target sector by the microcontroller. The control signal Inc_DLBA0 is asserted when a sector is transferred. The addition logic block 211 will then perform the function C=A where A is the 32 bit value output from the register DLBA0 210. If the Disk LBA Mode Select bit DLBA_MS is set, then the Block 211 outputs the 32 bit value output from the register DLBA0 210. Otherwise, if the Disk LBA Mode Select bit DLBA_MS is reset, then the Block 211 outputs the result of the addition of the value output from the register DLBA0 210 and the Sector Target Number from the Sector Target Number Register 250.

Because the value output from the addition block 211 is a 4 byte value, the multiplexer 212 has inputs 0 through 4 which are used to process the bytes of the CRC individually. The bytes from the addition block 211 are selected individually by the multiplexer 212 when the signal CRC time is asserted and the appropriate one of the CRC byte signals is asserted, as illustrated by the following:

select_3=CRC_time & CRC_3
select_2=CRC_time & CRC_2
select_1=CRC_time & CRC_1
select_0=CRC_time & CRC_0
select_4=CRC_time~+(CRC_3+CRC_2+CRC_1+CRC_0)~ where ~ denotes the complement of the signals, & denotes a logical AND operation and + denotes a logical OR operation.

The signals CRC_n, where n=3-0, indicate which byte of the CRC data is being processed. The signal CRC_0 is asserted at the time the first byte of the CRC data is being processed.

FIG. 10 shows the block diagram of the preferred embodiment of the host CRC generator/checker modified for LBA checking. The data flow through the host CRC Generator/Checker 304 is modified by introduction of the Exclusive-OR gate 302. The Exclusive-OR gate 302 includes the inputs 301 and 332, where the input 301 is coupled to transmit the buffer data, and the input 332 is coupled to the output of the AND gate 303. The AND gate 303 includes the inputs 331 and En3. The input 331 is coupled to the output of the multiplexer 314. The input En3 is the enable signal line En3 which is generated automatically by the control logic 271.

The counters HLBA3 313, HLBA2 312, HLBA1 311 and HLBA0 310 are loadable counters accessible by the local microcontroller through the internal microBus 234 and the read/write ports 323, 322, 321 and 320, respectively. The counters 310-313 are incremented when the control signal Inc_HLBA is asserted.

The multiplexer 314 is used to process the values output from the counters 310-313, one byte at a time. The inputs 0-4 of the multiplexer 314 are selected when the signal HCRC_time is asserted and the appropriate one of the HCRC byte signals is asserted, as illustrated by the following:

select_3=HCRC_time & HCRC_3
select_2=HCRC_time & HCRC_2
select_1=HCRC_time & HCRC_1
select_0=HCRC_time & HCRC_0
select_4=HCRC_time~+(HCRC_3+HCRC_2+HCRC_1+HCRC_0)

where ~ denotes the complement of the signals, a denotes a logical AND operation and + denotes a logical OR operation.

The signals HCRC_n, where n=3-0, indicate which byte of the host data buffer CRC is currently being processed. The signal HCRC_0 is asserted at the time the first byte of the host data buffer CRC is being processed.

If the Enable Host Buffer CRC bit EnHBCRC and the Enable Host Buffer LBA bit EnHBLBA are both enabled when the host buffer CRC time signal HCRC_time is asserted, the incoming buffer CRC is Exclusive-ORed with the output HLBA from the multiplexer 314 by the Exclusive-OR gate 302. As long as the enable signal lines En3 are set, the AND gate 303 will pass through the output HLBA from the multiplexer 314. This Exclusive-OR operation recovers the original CRC and inputs it to the HCRC Generator/Checker 304 which checks for a mismatch. If there is a mismatch, the signal HOST BUFFER CRC ERROR will be asserted.

If the Enable Most Buffer CRC bit EnHBCRC is enabled and the Enable Host Buffer LBA bit EnHBLBA is disabled, when the host buffer CRC time signal MCRC_time is asserted, the incoming buffer CRC is input to the HCRC Generator/Checker 304. If the HCRC Generator/Checker 304 detects a mismatch, the signal HOST BUFFER CRC ERROR will be asserted. This condition is satisfied by resetting the enable signal lines En3 so that the AND gate 303 will not pass through the output HLBA form the multiplexer 314.

As described above, the preferred embodiment of the apparatus of the present invention embeds the LBA within the CRC as the sector data is written to the storage media. When the sector data is read from the storage media the expected LBA value is used to separate the embedded LBA from the CRC. The CRC is then checked and if not correct an error is signalled. In this manner the transfer of a wrong sector is detected.

iii. Off-line Sector Identification

By extracting the LBA embedded in the CRC, for formats with and without ID, off-line sector identification can be performed by the apparatus of the present invention. Two such identification methods will be described.

In the first method, the local microcontroller will set the Enable Disk LBA bit EnDLBA, initialize the expected LBA to zero, and program the format sequencer 104 to read the next sector. The local microcontroller can also initialize the sector target number 250 with the Physical Sector Number PSN or the Logical Sector Number LSN of the sector to be accessed, with the ECC correction disabled. After the sector is read, if there was no ECC detected error, the CRC registers 204 contain the LBA embedded in the CRC with the same probability as the probability that any error will be detected by ECC. By providing access port means through the read/write port 221, for the local microcontroller to access the CRC Generator/Checker registers 204, the local microcontroller can read the LBA after the above operation. In the case of an ECC error after the read operation, the embedded LBA cannot be extracted by this method, the microcontroller may retry this operation a number of times, before employing other recovery methods.

The second method requires the operation of the format sequencer 104 to support disabling the disk interface while the format sequencer 104 is programmed to perform a disk operation, and providing ECC correction capability. In this second method, the local microcontroller will set the Enable Disk LBA bit EnDLBA, enable the transfer of the CRC data with the embedded LBA to the local buffer, initialize the expected LBA to zero and program the format sequencer 104 to read the next sector. The local microcontroller can also initialize the sector target number 250 with the Physical Sector Number PSN or the Logical Sector Number LSN of the sector to be accessed, with the ECC correction capability limited to provide at a minimum the same probability of error detection beyond correction as provided by the CRC. For example, with a 3-way interleaved code, capable of programmable correction up to a maximum of 3 bytes/interleave, and 4 bytes of CRC as taught in the above-referenced patent application, the correction is limited to only 1 byte/interleave. After the sector is read, if there was no ECC detected error, then the CRC registers 204 contain the LBA embedded in the CRC with the same probability that any error will be detected by ECC, and by providing access port means for the local microcontroller to access the CRC Generator/Checker registers 204, the local microcontroller can read the LBA after the above operation. If there was a correctable ECC error, then after the correction is done, the corrected data and the CRC with the embedded LBA are in the local buffer and the local microcontroller reprograms the format sequencer 104 to process this data for a write operation with the disk interface disabled. At the completion of this operation, the CRC Generator/Checker registers 204 contain the LBA embedded in the CRC with the same probability as the probability that an uncorrectable error will be detected by ECC. In the case of an uncorrectable error after the read operation, the embedded LBA cannot be extracted by this method, the microcontroller may retry this operation a number of times, before employing other recovery methods. In the preferred embodiment of this method the ECC correction implements the teaching of U.S. patent application Ser. No. 08/147,650 titled "REED-SOLOMON Decoder," filed on Nov. 4, 1993, which is hereby incorporated by reference.

The present invention has been described in terms of specific embodiments incorporating details to facilitate the understanding of the principles of construction and operation of the invention. Such references herein to specific embodiments and details thereof is not intended to limit the scope of the claims appended hereto. It will be apparent to those skilled in the art that modifications may be made in the embodiment chosen for illustration without departing from the spirit and scope of the invention.

We claim:

1. A method of increasing the reliability and efficiency of data transfers to and from a sector-organized disk drive storage medium having valid sectors identified by particular LBAs comprising the steps of:

a. obtaining an LBA identifying a valid sector to be written with sector information including a block of data and a CRC field;

b. embedding the LBA within the CRC field of the sector information, thereby creating an embedded LBA;

c. storing the sector information including the embedded LBA on the storage media;

d. determining a target LBA of a target sector;

e. using the target LBA to retrieve a sector of information;

f. separating the LBA from the CRC field of the retrieve sector;

g. comparing the separated LBA to the target LBA; and h. providing the sector data for processing by a host if the separated LBA matches the target LBA or providing an error signal if the separated LBA does not match the target LBA.

2. The method as claimed in claim 1 wherein the step of separating is performed by exclusive-Oring the CRC field having the embedded LBA with the target LBA for separating the LBA from the CRC field.

3. A method of formatting sectors on a storage media for later determination of retrieval of a wrong sector from the storage media, comprising the steps of:

a. determining an LBA of a sector to be stored;

b. embedding the LBA within a CRC field of the sector thereby creating an embedded LBA; and c. storing the embedded LBA in conjunction with the sector on the storage media.

4. The method as claimed in claim 3 further comprising the step of detecting a transfer of a wrong sector of information from a storage media by:

a. determining a target LBA of a target sector;

b. retrieving a sector including an embedded LBA;

c. separating the LBA from the CRC field;

d. comparing the LBA to the target LBA; and e. providing the sector to the host if the LBA matches the target LBA or providing an error signal if the LBA does not match the target LBA.

5. The method as claimed in claim 4 wherein the step of separating is performed by exclusive-Oring the CRC field having the embedded LBA with the target LBA value for separating the LBA value from the CRC field.

6. A method of increasing the reliability and efficiency of data transfers to and from a disk drive storage medium comprising the steps of:

a. embedding an LBA identifying a valid sector within a CRC field of sector information including sector data, thereby creating an embedded LBA;

b. storing the embedded LBA with the sector information including the sector data when the sector information is written to the storage media;

c. using the target LBA to retrieve the embedded LBA with the sector information including the sector data when the sector information is read from the storage media;

d. separating the LBA from the CRC field of the retrieved sector information; and e. comparing the separated LBA to an expected LBA value in order to determine if the separated LBA and the expected LBA value match in which case the sector data can be processed.

7. The method as claimed in claim 6 further comprising the step of providing an error signal if the LBA and the expected LBA value do not match.

8. The method as claimed in claim 6 wherein the steps a and b are performed during a format operation.

9. The method as claimed in claim 8 wherein the method is performed during minimal latency read and write operations.

10. The method as claimed in claim 6 wherein the step of embedding the LBA within the CRC field of the sector comprises the step of exclusive-Oring the LBA with the CRC field before it is stored with the sector of data.

11. The method as claimed in claim 10 wherein the step of separating is performed by exclusive-Oring the CRC field having the embedded LBA with the expected LBA value for separating the LBA value from the CRC field.

12. The method as claimed in claim 11 wherein the CRC field is checked after the embedded LBA value has been separated and if the CRC field is not correct an error will be signalled.

13. An apparatus for detecting a transfer of a wrong sector from a disk drive storage media comprising:

a. an embedding logic circuit coupled to a host and to the storage media for embedding an LBA within a CRC field of a sector of data, thereby creating an embedded LBA;

b. a writing logic circuit coupled to the host and to the storage media for writing the embedded LBA with a sector of data when the sector of data is written from the host to the storage media;

c. a reading logic circuit coupled to the host and to the storage media for retrieving the embedded LBA with the sector of data when the sector of data is read from the storage media;

d. a separating logic circuit coupled to the reading logic circuit for separating the LBA from the CRC field; and e. a comparing logic circuit for comparing the LBA to an expected LBA value in order to determine if the LBA and the expected LBA value match.

14. The apparatus as claimed in claim 13 wherein the embedding logic circuit further comprises a first Exclusive-OR logic circuit for embedding the LBA within the CRC field of the sector by exclusive-ORing the LBA with the CRC field.

15. The apparatus as claimed in claim 14 wherein the separating logic circuit comprises a second Exclusive-OR logic circuit for separating the LBA from the CRC field by exclusive-ORing the CRC field having the embedded LBA with the expected LBA value after the LBA and the sector of data have been read from the storage media.

16. The apparatus as claimed in claim 15 wherein the comparing logic circuit further comprises a checking logic circuit for checking the CRC field to determine if the LBA has been completely separated from the CRC field.

17. The apparatus as claimed in claim 16 further comprising an error signalling circuit coupled to the comparing logic circuit for signalling a transfer of a wrong sector when the LBA has not been completely separated from the CRC field.

18. An apparatus for detecting a transfer of a wrong sector from a disk drive storage media comprising:

a. a combining logic circuit for combining a stored LBA value with a sector of information by embedding the LBA value within a CRC field of the sector of information;

b. a writing logic circuit coupled to the combining logic circuit, to the storage media and to a host for writing the sector of information including the stored LBA to the storage media;

c. a reading logic circuit coupled to the host and to the storage media for retrieving a sector of information including the stored LBA from the storage media;

d. a separating logic circuit coupled to the reading logic circuit for separating a read LBA value from the CRC field of the sector of information;

e. a comparing logic circuit coupled to the separating logic circuit for checking the read LBA value to determine if the read LBA value is identical to an expected LBA value; and f. an error signalling logic circuit coupled to the comparing logic circuit for signalling a transfer of a wrong sector when the read LBA value is not identical to the expected LBA value.

19. The apparatus as claimed in claim 18 wherein the combining logic circuit includes a first Exclusive-OR logic circuit for embedding the LBA value within the CRC field by Exclusive-ORing the LBA with the CRC field.

20. The apparatus as claimed in claim 19 wherein the separating logic circuit includes a second Exclusive-OR logic circuit for separating the LBA value from the combined field by Exclusive-ORing the combined field with an expected LBA value.

21. The apparatus as claimed in claim 20 further comprising an expected LBA value generating circuit coupled to the separating logic circuit for generating the expected LBA value.

22. A method of detecting a transfer of a wrong sector from a disk drive storage media comprising the steps of:

a. combining a stored LBA value with a sector of information by embedding the LBA value within a CRC field of the sector of information, thereby creating a combined field;

b. storing the sector of data including the combined field on the storage media;

c. retrieving a sector of data including a combined field from the storage media;

d. separating an LBA value from the combined field thereby forming a read CRC field;

e. checking the read CRC field to determine if the LBA value has been completely separated from the read CRC field; and f. signalling a transfer of a wrong sector when the LBA value has not been completely separated from the read CRC field.

23. The method as claimed in claim 22 wherein the step of combining includes exclusive-ORing the LBA value with the CRC field thereby embedding the LBA value within the CRC field.

24. The method as claimed in claim 23 further comprising the step of generating an expected LBA value.

25. The method as claimed in claim 24 wherein the step of separating includes exclusive-ORing the combined field with the expected LBA value.

26. A method of increasing the reliability and efficiency of data transfers to and from a disk drive storage medium having valid sectors identified by particular LBAs comprising the steps of:

a. mapping the storage medium into multiple sectors starting with a first sector, each sector having a physical address associated therewith and including a block of data and a CRC field;

b. assigning a first LBA to said first sector;

c. adding a target sector number to said first LBA to translate the physical addresses of the sectors to LBA values for identifying valid sectors;

d. obtaining an LBA of a valid sector to be written;

e. embedding the obtained LBA within the CRC field of the valid sector to be written, thereby creating an embedded LBA;

f. storing the embedded LBA in conjunction with the valid sector data on the storage media;

g. determining a target LBA of a target sector;

h. retrieving a sector of information including an embedded LBA;

i. separating the retrieved LBA from the CRC field;

j. comparing the separated LBA to the target LBA; and k. providing the sector data for processing by the host if the separated LBA matches the target LBA or providing an error signal if the LBA does not match the target LBA.

* * * * *